United States Patent [19]

Matsumoto et al.

[11] 3,886,184
[45] May 27, 1975

[54] AMINODIBENZO(B,D)PYRANS
[75] Inventors: Ken Matsumoto; Robert A. Archer, both of Indianapolis, Ind.
[73] Assignee: Eli Lilly and Company, Indianapolis, Ind.
[22] Filed: Aug. 3, 1973
[21] Appl. No.: 385,367

[52] U.S. Cl......... 260/345.3; 424/283; 260/251 QA
[51] Int. Cl.............................................. C07d 7/20
[58] Field of Search................................. 260/345.3

[56] References Cited
UNITED STATES PATENTS
3,656,906   4/1972   Bullock........................... 260/345.3

*Primary Examiner*—John M. Ford
*Attorney, Agent, or Firm*—James L. Rowe; Everet F. Smith

[57] ABSTRACT

Tetrahydro and hexahydro 1-amino-3-alkyl-6H-dibenzo[b,d]pyrans useful as anti-depressant, anti-anxiety, or analgesic agents.

7 Claims, No Drawings

AMINODIBENZO(B,D)PYRANS

BACKGROUND OF THE INVENTION

During the 1940's, a group at the University of Illinois under Professor Roger Adams investigated the active principle of marijuana or hashish—a resinous substance obtained from *Cannabis sativa*. It was determined that the active compounds in *Cannabis* had the same basic ring structure—a dibenzo[b,d]pyran ring system illustrated in I (with the usual numbering system).

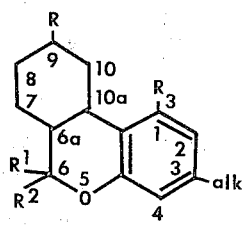

The active principle was thought to be tetrahydrocannabinol (I where R, $R^1$ and $R^2$ are methyl, $R^3$ is hydroxyl and alk is n-pentyl) with a $\Delta^8$, $\Delta^9$ or $\Delta^{6a(10a)}$ double bond. The synthesis of the $\Delta^{6a(10a)}$ double bond compound is described in, among other places, Adams, U.S. Pat. No. 2,419,935. A second Adams patent, U.S. Pat. No. 2,509,386, describes $\Delta^{6a(10a)}$ compounds in which alk in formula I is a group other than n-pentyl. Optically active derivatives of $\Delta^{6a(10a)}$-tetrahydrocannabinol [also called $\Delta^{6a(10a)}$-THC] are disclosed in Adams, U.S. Pat. No. 2,419,934 and the synthesis of both $\Delta^8$ and $\Delta^9$-THC are disclosed in Adams U.S. Pat. No. 2,419,936.

In 1964 Gaoni and Mechoulam found that the active constituent of hashish was $\Delta^9$-THC. $\Delta^{6a(10a)}$-THC, although it has the typical pharmacological activity of hashish, does not in fact occur in the resin fraction according to Gaoni and Mechoulam [*J. Am. Chem. Soc.*, 86, 1646 (1964)].

Large numbers of $\Delta^{6a(10a)}$-THC analogues in which alk is other than n-pentyl have been prepared and their preparation is referred to in *Problems of Drug Dependence-Cannabis (Marijuana) Selected Bibliography (1950-1967)* prepared by the Medical Literature Branch, Bureau of Medicine, FDA, Department of Health, Education and Welfare, Addendum I, Substances Occurring Naturally in Marijuana, etc., Isbel, (Washington, D.C., 1968). This review article and an article entitled *Recent Advances in the Chemistry of Hashish*, Mechoulam and Gaoni, *Fortschritte Der Chemie Organicher Naturstoffe*, 25, 175 (Springer, Wien, 1967) contain extensive bibliographies with references to both the synthesis and structure of the naturally-occurring constituents of marijuana as well as to synthetic analogues prepared by various laboratories. Of particular interest, however, are the following specific articles also referred to in the above review articles: Smith, *J. Am. Chem. Soc.*, 89, 4551 (1967); Kierstead, *J. Am. Chem. Soc.*, 88, 2079 (1966); 89, 5934 (1967); Mosher, *J. Am. Chem. Soc.*, 88, 1834 (1962); Taylor, *J. Am. Chem. Soc.*, 88, 367 (1966); Petrzilka, *Helv. Chim. Acta*, 50, 1419 (1967). In addition to the above references from the chemical literature, special mention should be made of the following U.S. Patents: U.S. Pat. No. 3,388,136; U.S. Pat. No. 3,639,427; U.S. Pat. No. 3,668,224; U.S. Pat. No. 3,694,464; U.S. Pat. No. 3,560,528; U.S. Pat. No. 3,636,058 and references cited therein not otherwise mentioned herein.

Dibenzo[b,d]pyrans containing an amino-containing substituent attached to the benzene ring or to the tetrahydrobenzene ring are described in U.S. Pat. No. 3,649,650 which discloses amino alkyl ethers of $\Delta^9$-THC and related derivatives having different alkyl groups at 3 and U.S. Pat. No. 3,676,462 which discloses dibenzo[b,d]pyrans having an aminoalkyl group at 1 or at 3. These compounds are described as having CNS properties or CNS activity. No mention has been found in the literature of compounds of Formula I above in which $R^3$ is an amino group regardless of the substituents for R, $R^1$, $R^2$ and alk and regardless of the precise position of the double bond in the tetrahydro benzene ring.

SUMMARY OF THE INVENTION

This invention provides aminodibenzopyrans of the formulas

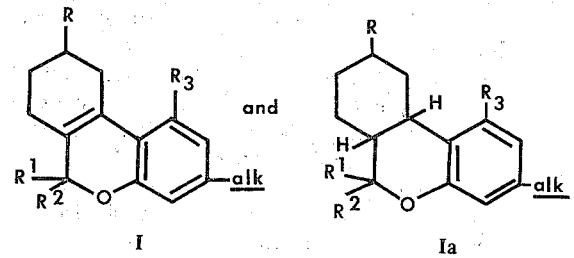

wherein R, $R^1$, and $R^2$ are individually hydrogen or methyl, alk is a $C_1$-$C_{10}$ alkyl group or a $C_3$-$C_8$ cycloalkyl group and $R^3$ is amino, lower alkyl amino, di-lower alkylamino, or lower alkanoyl amino. A preferred group of compounds are those in which both $R^1$ and $R^2$ are hydrogen or in which both $R^1$ and $R^2$ are methyl.

In the above formula, the term "lower alkyl" means a $C_1$-$C_3$ alkyl group, for example, methyl, ethyl, n-propyl or isopropyl. Similarly, the term "lower alkanoyl" means a $C_1$-$C_3$

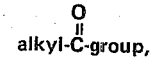

alkyl-C-group, as for example, acetyl propionyl, butyryl, isobutyryl and the like. The term alk includes, but is not limited to, the following alkyl groups: methyl, ethyl, n-propyl, isopropyl, sec-butyl, n-butyl, isobutyl, iso-amyl, t-amyl, n-amyl, 2-pentyl, 3-pentyl, 3-methyl-2-butyl, 2-hexyl, 1-hexyl, 3-hexyl, 4-methyl-1-pentyl, 3-methyl-1-pentyl, 3-methyl-2-pentyl, neopentyl, 3,3-dimethyl-1-butyl, 3,3-dimethyl-1-pentyl, 3,3,4-trimethyl-1-pentyl, 2,2,4-trimethyl-1-pentyl, 2,4,4-dimethyl-2-pentyl, iso-octyl, isoheptyl, n-heptyl, 2-heptyl, 3-heptyl, 4-heptyl, 2-octyl, 3-octyl, 4-octyl, n-nonyl, 2-nonyl, 4-nonyl, 5-nonyl, 4-methyl-2-octyl, 2-n-propyl-1-hexyl, n-decyl, isodecyl, 4-decyl, 1-methylcyclopentyl, 2-methylcyclopentyl, cyclopropyl, cyclobutyl, 2-methylcyclobutyl, cyclopentyl, 1-methylcyclohexyl, 3-methylcyclohexyl, cycloheptyl, 2-methylcycloheptyl, cyclooctyl and the like.

Compounds coming within the scope of this invention include $\Delta^{6a(10a)}$-1-di-n-propylamino-3-(1'-ethylbutyl)-7,8,9,10-tetrahydro-9-methyl-6H-dibenzo[b,d]pyran, $\Delta^{6a(10a)}$-1-propionylamino-3-(1',2'-dimethylhexyl)-7,8,9,10-tetrahydro-6,9-dimethyl-6H-dibenzo[b,d]pyran, $\Delta^{6a(10a)}$-1-butyrylamino-3-(2'-methyloctyl)-7,8,9,10-tetrahydro-6,9-dimethyl-6H-dibenzo[b,d]pyran, $\Delta^{6a(10a)}$-1-amino-3-cyclopropyl-7,8,9,10-tetrahydro-6,6,9-trimethyl-6H-dibenzo[b,d]pyran, $\Delta^{6a(10a)}$-1-methylamino-3-cyclooctyl-7,8,9,10-tetrahydro-6,6,9-trimethyl-6H-dibenzo[b,d]pyran, $\Delta^{6a(10a)}$-1-dimethylamino-3(2'-methylcyclopentyl)-7,8,9,10-tetrahydro-6,6,9-trimethyl-6H-dibenzo[b,d]pyran, $\Delta^{6a(10a)}$-1-amino-3-(2'-methylcyclopentyl)-7,8,9,10-tetrahydro-9-methyl-6H-dibenzo[b,d]pyran, $\Delta^{6a(10a)}$-1-methylamino-3-(n-decyl)-7,8,9,10-tetrahydro-6,6,9 trimethyl-6H-dibenzo[b,d]pyran, $\Delta^{6a(10a)}$-1-dimethylamino-3,9-dimethyl-7,8,9,10-tetrahydro-6H-dibenzo[b,d]pyran, $\Delta^{6a(10a)}$-1-acetylamino-3-ethyl-7,8,9,10-tetrahydro-6,6,9-trimethyl-6H-dibenzo[b,d]pyran, $\Delta^{6a(10a)}$-1-ethylamino-3-n-butyl-7,8,9,10-tetrahydro-9-methyl-6H-dibenzo[b,d]pyran, $\Delta^{6a(10a)}$-1-diethylamino-3-(1'-methylbutyl)-7,8,9,10-tetrahydro-6,6,9-trimethyl-6H-dibenzo[b,d]pyran, $\Delta^{6a(10a)}$-1-isopropylamino-3-(1',1'-dimethylbutyl)-7,8,9,10-tetrahydro-6,6,9-trimethyl-6H-dibenzo[b,d]pyran.

1-amino-3-n-pentyl-6a,7,8,9,10,10a-hexahydro-6,6,9-trimethyl-6H-dibenzo[b,d]pyran, 1-amino-3-(1',1'-dimethylheptyl)-6a,7,8,9,10a-hexahydro-9-methyl-6H-dibenzo[b,d]pyran 1-amino-3-(1',2'-dimethylheptyl)-6a,7,8,9,10,10a-hexahydro-6,9-dimethyl-6H-dibenzo[b,d]pyran 1-methylamino-3-(1',2'-dimethylpentyl) 6a,7,8,9,10,10a-hexahydro-6,6,9-trimethyl-6H-dibenzo[b,d]pyran 1-diethylamino-6a,7,8,9,10,10a-hexahydro-3,6,6,9-tetramethyl-6H-dibenzo[b,d]pyran.

Some of the compounds of this invention are prepared from $\Delta^{6a(10a)}$-7,8,9,10-tetrahydro-1-hydroxy-3-alkyl-6,6,9-trimethyl-6H-dibenzo[b,d]pyrans. Compounds of this structure were originally prepared by Roger Adams and coworkers (see for example U.S. Pat. No. 2,419,935 and U.S. Pat. No. 2,419,934) at the University of Illinois during the 1940's. According to the procedure developed at the University of Illinois Laboratories, a 5-alkylresorcinol is condensed with ethyl cyclohexanone-2-carboxylate (or the corresponding 5-methyl derivative) in benzene solution in the presence of phosphorus oxychloride as a condensing agent to yield a benzopyrone of Formula II below

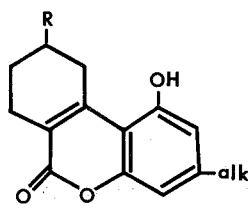

II wherein R is H or methyl and alk is $C_1$-$C_{10}$ alkyl.

Treatment of the benzopyrone (II) with methyl Grignard Reagent followed by acidification yields the $\Delta^{6a(10a)}$-tetrahydrodibenzopyran of Formula III wherein R and alk have the same meaning as before and $R^1$ and $R^2$ are methyl.

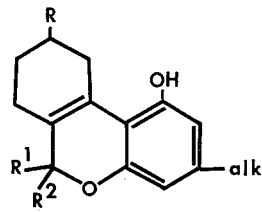

Reduction of a compound according to Formula II by means of sodium bismethoxyethoxy aluminum hydride in benzene yields 2-(2'-hydroxymethyl)-$\Delta^1$-(cyclohexenyl)-5-(optionally alkyl)-resorcinol which, upon treatment with aluminum oxide in benzene, cyclizes to yield a compound according to Formula III wherein $R^1$ and $R^2$ are both hydrogen and R and alk have the same meaning as heretofore.

A typical synthesis using this latter procedure is as follows: In a 300 ml. flask were placed 22 ml. of a 70 percent benzene solution of sodium bismethoxyethoxy aluminum hydride in 25 ml. of anhydrous benzene. The resulting solution was cooled to about 0°C. and 4 g. of $\Delta^{6a(10a)}$-7,8,9,10-tetrahydro-1-hydroxy-3-(1',2'-dimethylheptyl)-9-methyl-6-dibenzopyrone dissolved in 50 ml. benzene were slowly added. After the addition has been completed, the reaction mixture was allowed to warm to room temperature at which temperature it was stirred for an additional hour. The solution was then chilled to about 0°C. and the complex reaction product plus excess aluminum hydride decomposed by the slow addition of 200 ml. of 10 percent aqueous hydrochloric acid. The organic layer was separated, and the aqueous layer extracted twice with 200 ml. portions of ether. The ether extracts were combined with the original organic layer, and the whole dried. Evaporation of the solvents in vacuo yielded 4 g. of white crystalline solid comprising 2-(2-hydroxymethyl-5-methyl-$\Delta^1$-(cyclohexenyl)-5-(1',2'-dimethylheptyl)resorcinol: nmr (CDCl$_3$-DMSO-d$_6$)—CH$_2$—0,3.8$\delta$ (s), aromatic, 6.5$\delta$ (s). The crude triol was dissolved without further purification in about 200 ml. of benzene to which was added 8 g. of neutral activity Grade 1 alumina. The reaction mixture was refluxed with stirring overnight using a water eliminator. An additional 8 g. of alumina were added, and the stirring and refluxing continued for another 24 hours. After filtration of the alumina and evaporation of the reaction mixture to dryness in vacuo, a viscous oil was obtained. Chromatography of a benzene solution of this oil over 60 g. of silica gel using 300 ml. of benzene as an eluant afforded 2.20 g. of viscous oil comprising $\Delta^{6a(10a)}$-7,8,9,10-tetrahydro-1-hydroxy-3-(1',2'-dimethylheptyl)-9-methyl-6H-dibenzo[b,d]pyran, which later slowly crystallized: nmr(CDCl$_3$)—CH$_2$—O—,4.35$\delta$ (s), OH, 4.80$\delta$ (s) aromatic, 6.10$\delta$ (d,J=1 cps) 6.25 (d,J=1 cps); molecular ion, m/e=342.

Anal. Calc. for $C_{23}H_{34}O_2$: C, 80.65; H, 10.01

Found: c, 80.48; H, 9.81

The following $\Delta^{6a(10a)}$-7,8,9,10-tetrahydro-1-hydroxy-3-alkyl-6,6-des-dimethyldibenzo[b,d]pyrans optionally substituted with a methyl at 9 were prepared by the above procedure: $\Delta^{6a(10a)}$-7,8,9,10-tetrahydro-1-hydroxy-3,9-dimethyl-6H-dibenzo[b,d]pyran, m.p. = 128°–9°C.; $\Delta^{6a(10a)}$-7,8,9,10-tetrahydro-1-hydroxy-3-n-pentyl-9-methyl-6H-dibenzo[b,d]pyran, m.p. = 131°–2°C.; $\Delta^{6a(10a)}$-7,8,9,10-tetrahydro-1-hydroxy-3-(1',1'-dimethylheptyl)-9-methyl-6H-dibenzo[b,d]pyran Anal. Calcd. for $C_{23}H_{34}O_2$: C, 80.65; H, 10.01.

Found: C, 80.47; H, 10.11.

$\Delta^{6a(10a)}$-7,8,9,10-tetrahydro-1-hydroxy-3-(2'-methylcyclohexyl)-9-methyl-6H-dibenzo[b,d]pyran, m.p. = 169°–170°. Pyranones useful for preparing the above compounds are available from the work of Adams and coworkers [See J. Am. Chem. Soc., 62, 2405 (1940); 63, 1973 (1941); 70, 664 (1948)]. Pyranone starting materials in which the methyl group at 9 is lacking or which contain a 2-methylcyclohexyl group at 3 are prepared by procedures entirely analogous to those set forth in the above cited Adams and coworker publications. Compounds in which only one of $R^1$ and $R^2$ is methyl are prepared by the Grignard procedure except that equimolar or less quantities of methyl Grignard are used.

Compounds according to Formula III above in which R is methyl and $R^1$ and $R^2$ are either both hydrogen or both methyl can exist in two optically active forms since the carbon atom at 9 is asymmetric. (The presence of asymmetric carbon atoms in the side chain at 3 designated by alk in the above formula as in the 1,2-dimethylheptyl group will of course increase the stereo chemical complexity of the above synthetic procedures). Adams and coworkers recognized the possibility of stereoisomerism and proceeded to the preparation of D and L isomers of compounds according to Formula III wherein $R^1$ and $R^2$ are methyl and alk is n-pentyl or other alkyl group devoid of asymmetric centers. The preparation of these optically active pyranones was accomplished by using as the starting β-keto ester in the pyranone synthesis either D(+) ethyl 5-methylcyclohexanone-2-carboxylate or L(-)ethyl 5-methylcyclohexanone-2-carboxylate. In carrying out the above procedure the use of the optically active keto ester results in an optically active dibenzopyran of formula III depending on whether methyl Grignard is used to react with the optically active dibenzopyrone of formula II to yield compounds in which both $R^1$ and $R^2$ are methyl or whether the hydride reduction followed by cyclization is employed to yield compounds in which $R^1$ and $R^2$ are both hydrogen. Where a side chain at 3 contains asymmetric carbons, as for example with the 1,2-dimethylheptyl group, a side chain which contains two asymmetric carbon atoms, there will be further diastereoisomers attributable solely to the side chain. For example, in $\Delta^{6a(10a)}$-7,8,9,10-tetrohydro-1-hydroxy-6,9,9-trimethyl-3-(1',2'-dimethylheptyl)-6H-dibenzo[b,d]pyran, there are three asymmetric centers—two in the side chain and one at 9, yielding 8 diastereoisomers occurring as four separate racemic pairs. Pure optical isomers of such products can be obtained by resolution of the final product, by utilizing optically active alkyl groups in preparing the resorcinol starting material, by resolving the resorcinol starting material into its four optical isomers, by using an optically active cyclohexanonecarboxylate as illustrated above, or by combinations of these well known procedures.

Optically active dibenzopyrans produced from an optically active ethyl-5-methylcyclohexanone-2-carboxylate include d+ and l- $\Delta^{6a(10a)}$-7,8,9,10-tetrahydro-1-hydroxy-3-(1',1'-dimethylheptyl)-6,6,9-trimethyl-6H-dibenzo[b,d]pyran. The d+ isomer has an $[\alpha]_D + 142.5°$ and the l- isomer has a $[\alpha]_D = -78.2°$ (ethanol). $\Delta^{6a(10a)}$-7,8,9,10-tetrahydro-1-hydroxy-3-(1',1'-dimethylheptyl)-9-methyl-6H-dibenzo[b,d]pyran: d+ isomer $[\alpha]_D = +127°$ ($CHCl_3$) and l- isomer $[\alpha]_D = -55°$ ($CHCl_3$).

The preparation of the compounds of this invention from starting materials having the structure of formula III above is carried out as follows: The 1-hydroxy-3-alkyldibenzopyran III is dissolved in a suitable solvent such as dimethylformamide and reacted with sodium hydride to form the sodium salt on the phenolic group. This sodium salt is then reacted with 2-phenyl-4-chloroquinazoline to form the 2'-phenyl-4'-quinazolinyloxy derivative. The quinazolinyloxy compound is then rearranged to the 2'-phenyl-4'-oxo-3'-quinazolinyl derivative. Treatment of this latter type of compound with alkali, for example potassium hydroxide in ethyleneglycol, serves to hydrolyze the quinazolinyl group and form the corresponding $\Delta^{6a(10a)}$-7,8,9,10-tetrahydro-1-amino-3-alkyl-6H-dibenzo[b,d]pyran, optionally having methyl groups in the 6 and 9 positions. Compounds of this invention in which the 1-amino group thus formed is acylated are prepared by standard procedures such as usisng an acyl halide or anhydride in an inert solvent. The compounds of this invention in which the amino group is methylated are prepared by reductive formylation where the dimethyl-amino derivative is desired or by reacting the amino group with formyl imidazole to produce the 1-formyl amino derivative which is readily reduced with sodium dimethoxyethoxy aluminum hydride to yield the monomethylamino ethylamino derivative.

Compounds of Formula Ia can be prepared by aminating as outlined above a hexahydrodibenzopyran of Formula IIIa

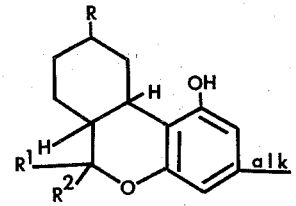

IIIa wherein R, $R^1$, $R^2$ and alk have the same meaning as hereinabove. The hexahydro derivatives of Formula IIIa are readily prepared by hydrogenation of the corresponding compound according to Formula III.

The invention is further illustrated by the following specific examples.

EXAMPLE 1

Synthesis of
$\Delta^{6a(10a)}$-1-(2'-Phenyl-4'-quinazolinyloxy-3-(1',2'-dimethylheptyl)-7,8,9,10-tetrahydro-6,6,9-trimethyl-6H-dibenzo[b,d]pyran.

A solution was prepared containing 19.8 g. of $\Delta^{6a(10a)}$-1-hydroxy-3-(1'2'-dimethylheptyl)-7,8,9,10-tetrahydro-6,6,9-trimethyl-6H-dibenzo[b,d]pyran in 300 ml. of dimethylformamide (DMF). 3.1 g. of a 50% dispersion of sodium hydride in mineral oil was rapidly added to the stirred solution. After 1 hour, the escape of hydrogen gas from the solution had ceased. Next, 14.2 g. of 2-phenyl-4-chloroquinazoline were added rapidly and the mixture stirred with heating to a temperature in the range 150°–160°C. for about 2 hours. The reaction mixture was cooled and then poured onto 800 ml. of water at about 10°C. The organic layer was separated and the aqueous layer extracted 5 times with 300 ml. portions of ether. The ether layers were combined, washed with water and then dried. Evaporation of the ether in vacuo yielded about 30 g. of a dark, viscous oil comprising $\Delta^{6a(10a)}$-1-(2'-phenyl-4'-quinazolinyloxy)-3 -(1',2'-dimethylheptyl)-7,8,9,10-tetrahydro-6,6,9-trimethyl-6H-dibenzo[b,d]pyran formed in the above reaction. The viscous oil was dissolved in benzene and chromatographed over 1,000 g. of silica gel. The chromatogram was developed with benzene and the elution pattern followed by thin layer chromatography. Purified $\Delta^{6a(10a)}$-1-(2'-phenyl-4'-quinazolinyloxy)-3-(1',2'-dimethylheptyl)-7,8,9,10-tetrahydro-6,6,9-trimethyl-6H-dibenzo[b,d]pyran was obtained in 62% yield. The compound had the following characteristics:
$\lambda_{max}^{MeOH} = 212$ m$\mu$ (23,000), 257 (19,200); nmr absorption (CDCl$_3$) at 6.60$\delta$ (d), 6.65 (d), (C-2 and C-4 aromatic), 7.2–8.5$\delta$ (m) (quinazoline aromatic); molecular ion by mass spectrograph, m/e = 574 with strong M-15 peak at m/e = 259.

Anal. Calcd. for C$_{39}$H$_{46}$N$_2$O$_2$: C, 81.49; H, 8.07; N, 4.87.

Found: C, 81.76; H, 8.10; N, 4.80.

Other compounds preparable by the above procedure include the following:

$\Delta^{6a(10a)}$-1-(2'-phenyl-4'-quinazolinyloxy)-7,8,9,10-tetrahydro-3,6,6,9-tetramethyl-6H-dibenzo[b,d]pyran having the following physical and chemical properties: m.p. = 184°–186°, nmr absorption (CDCl$_3$) at 2.30$\delta$ (s), aromatic CH$_3$, 6.55$\delta$ (d), (C-2 and C-4 aromatic) 7.2–8.5 (m) (quinazoline aromatic); molecular ion by mass spectrograph, m/e = 462 with strong M-15 peak at m/e = 447.

Anal. Calcd. for C$_{31}$H$_{30}$N$_2$O$_2$: C, 80.49; H, 6.54; N, 6.06.

Found: C, 80.23; N, 6.13. N, 6.18.

$\Delta^{6a(10a)}$-1-(2'phenyl-4'-quinazolinyloxy)-3-n-pentyl-7,8,9,10-tetrahydro-6,6,9-trimethyl-6H-dibenzo[b,d]pyran having the following physical and chemical properties:
m.p. = 135°–136°C. from methanol. Molecular ion, m/e = 518 with M-15 peak at 503. $\lambda_{max}^{MeOH}$ =257 m$\mu$ (20,200) nmr absorption (CDCl$_3$) at 0.65$\delta$(d), C-9 methyl, 1.30$\delta$ (s), 1.45 (s), 6,6-methyls, 6.65$\delta$ (d), 6.70 (d), (C-2 and C-4 aromatic), 7.2–8.5 $\delta$ (m), (quinazoline aromatic).

Anal. Calcd. for C$_{35}$H$_{38}$N$_2$O$_2$: C, 81.05; H, 7.38; N, 5.40.

Found: C, 81.00; H, 7.64; N, 5.41.

$\Delta^{6a(10a)}$-1-(2'-phenyl-4'-quinazolinyloxy)-3-(1',1'-dimethylheptyl)-7,8,9,10-tetrahydro-6,6,9-trimethyl-6H-dibenzo [b,d]pyran having the following physical and chemical characteristics: nmr absorption (CDCl$_3$) at 0.65$\delta$ (d), C-9 methyl, 1.15$\delta$ (s), 1.45 (s), 6,6-methyls, 1.25$\delta$ (s), 1',1'-methyls, 6.75$\delta$ (d), 6.85 (d), (C-2 and C-4 aromatic), 7.20–8.5$\delta$ (m), (quinazoline aromatic); molecular ion, m/e =10 574 with M-15 peak at 559.

Anal. Calcd. for C$_{39}$H$_{46}$N$_2$O$_2$: C, 81.49; H, 8.07; N, 4.87.

Found: C, 81.35; H, 8.18; N, 4.61.

$\Delta^{6a(10a)}$-1(2'-phenyl-4'-quinazolinyoxy)-3-(2'-methylcyclohexyl)-7,8,9,10-tetrahydro-6H-dibenzo[b,d]pyran having the following physical and chemical properties: nmr absorption (CDCl$_3$) at 6.65$\delta$ (d), 6.75 (d), (C-2 and C-4 aromatic), 7.20–8.50$\delta$ (m), (quinazoline aromatic); molecular ion, m/e = 544 with M-15 peak at 529.

Anal. Calcd. for C$_{37}$H$_{40}$N$_2$O$_2$: C, 81.58; H, 7.40; N, 5.14.

Found: C, 81.86; H, 7.61; N, 4.89.

EXAMPLE 2

Preparation of
$\Delta^{6a(10a)}$-1-(2'-Phenyl-4'-oxo-3'-quinazolinyl)-3-(1',2'-dimethylheptyl)-7,8,9,10-tetrahydro-6,6,9-trimethyl-6H-dibenzo-[b,d]pyran.

About 6.02 g. of $\Delta^{6a(10a)}$-1-(2'-phenyl-4'-quinazolinyloxy)-3-(1',2'-dimethylheptyl)-7,8,9,10-tetrahydro-6,6,9-trimethyl-6H-dibenzo[b,d]pyran were placed in a 25 ml. round bottom flask and heated to about 330°C. for 3 hours under a nitrogen atmosphere. The resulting glassy residue comprising $\Delta^{6a(10a)}$-1-(2'-phenyl-4'-oxo-3'-quinazolinyl)-3-(1',2'-dimethylheptyl)-7,8,9,10-tetrahydro-6,6,9-trimethyl-6H-dibenzo-[b,d]pyran formed in the above rearrangement was dissolved in benzene. The benzene solution was chromatographed over 250 g. of silica gel. The chromatogram was developed with 1 liter of benzene followed by 6 liters of benzene containing 1% ethyl acetate. 4.14 g. of a foamy yellow solid was obtained by evaporation of fractions which were indicated by thin layer chromatography to contain a compound different from starting material. $\Delta^{6a(10a)}$-1-(2'phenyl-4'-oxo-3'-quinazolinyl)-3-(1',2'-dimethylheptyl)-7,8,9,10-tetrahydro-6,6,9-trimethyl-6H-dibenzo[b,d]pyran thus prepared has the following characteristics: $\lambda_{max}^{EtOH}$ = 205 m$\mu$ (59,000), 227 m$\mu$ (46,400), 261 m$\mu$ (24,000); nmr absorption (CDCl$_3$) 6.3–8.5$\delta$ (m) (aromatic); molecular ion, m/e = 574 with M-15 peak at m/e = 559.

Anal. calcd. for C$_{39}$H$_{46}$N$_2$O$_2$: C, 81.49; H, 8.07; N, 4.87.

Found: C, 81.24; H, 8.04; N, 5.09.

Other compounds preparable by the above procedure include the following. Physical and chemical properties are also listed.

$\Delta^{6a(10a)}$-1-(2'-phenyl-4'-oxo-3'-quinazolinyl)-7,8,9,10-tetrahyro-3,6,6,9-tetramethyl-6H-dibenzo[b,d]pyran. nmr absorption (CDCl$_3$) at 0.45$\delta$ (d), C-9 methyl, 1.30$\delta$(s), 6,6-dimethyl, 2.30$\delta$ (s), C-3 methyl, 6.50–8.60$\delta$ (m), aromatic; molecular ion, m/e=462 with M-15 peak at 447.

Anal. Calcd. for C$_{31}$H$_{30}$N$_2$O$_2$: C, 80.49; H, 6.54; N, 6.06.

Found: C, 80.21; H, 6.79; N, 5.92.

$\Delta^{6a(10a)}$-1-(2'-phenyl-4'-oxo-3'-quinazolinyl)-3-n-pentyl 7,8,9,10-tetrahydro-6,6,9-trimethyl-6H-dibenzo[b,d]pyran. $\lambda_{max}^{CH_3OH}$ = 227 m$\mu$ (59,600), 260 m$\mu$ (28,800); nmr absorption (CDCl$_3$) at 1.30$\delta$ (s), C-6 methyls, 6.35–8.80$\delta$ (m), aromatic; molecular ion, m/e = 518 with M-15 peak at 503.

Anal. Calcd. for $C_{35}H_{38}N_2O_2$: C, 81.05; H, 7.38; N, 5.40

Found: C, 80.95; H, 7.34; N, 5.66

$\Delta^{6a(10a)}$-1-(2'phenyl-4'-oxo-3'-quinazolinyl)-3-(1',1'-dimethylheptyl)-7,8,9,10-tetrahydro-6,6,9-trimethyl-6H-dibenzo [b,d]pyran. nmr absorption (CDCl$_3$) at 6.50–8.50$\delta$ (m), aromatic; molecular ion, m/e=574 with M-15 peak at 559.

Anal. Calcd. for $C_{39}H_{46}N_2O_2$: C, 81.49; H, 8.07; N, 4.87.

Found: C, 81.74; H, 7.87; N, 5.12.

$\Delta^{6a(10a)}$-1-(2'-phenyl-4'-oxo-3'-quinazolinyl)-3-(2'-methylcyclohexyl)-7,8,9,10-tetrahydro-6,6,9-trimethyl-6H-dibenzo[b,d]pyran. nmr absorption (CDCl$_3$) at 6.40–8.90$\delta$ (m), aromatic; molecular ion, m/e = 544 with M-15 peak at 529.

Anal. Calcd. for $C_{37}H_{40}N_2O_2$: C, 81.58; H, 7.40; N, 5.14.

Found: C, 81.26; H, 7.37; N, 4.96.

EXAMPLE 3

Synthesis of
$\Delta^{6a(10a)}$-1-Amino-3-(1',2'-dimethylheptyl)-7,8,9,10-tetrahydro-6,6,9-trimethyl-6H-dibenzo[b,d]pyran.

A solution containing 30 g. of potassium hydroxide in 400 ml. of ethylene glycol containing 20 ml. of water was prepared in a 1 liter 3-neck flask. About 3.54 g. of the $\Delta^{6a(10a)}$-1(2'-phenyl-4'-oxo-3'-quinazolinyl)-3(1',2' dimethylheptyl)7,8,9,10-tetrahydro-6,6,9-trimethyl-6H-dibenzo [b,d]pyran was added and the resulting mixture was stirred and heated to about 150°C. for a period of about 16 hours. The reaction mixture was cooled to room temperature and then poured into 400 ml. of water maintained at about 10°C. The aqueous mixture was extracted with four 150-ml. portions of ether. The ether extracts were separated and combined, and the combined extracts washed with water and dried. Evaporation of the ether in vacuo yielded 3 g. of $\Delta^{6a(10a)}$-1-amino-3-(1',2'-dimethylheptyl)-7,8,9,10-tetrahydro-6,6,9-trimethyl-6H-dibenzo [b,d]pyran as a crude viscous oil. The oil was dissolved in benzene and chromatographed over 200 g. of silica gel. A development of the chromatogram with 3 liters of benzene gave a 60% yield of a tannish oil comprising of $\Delta^{6a(10a)}$-1-amino-3-(1',2'-dimethylheptyl)-7,8,9,10-tetrahydro-6,6,9-trimethyl-6H-dibenzo[b,d]pyran having the following characteristics:

nmr absorption (CDCl$_3$) at 3.7$\delta$ (broad) (amino group); 6.0 (d), (J $\approx$ 2 cps), 6.9 (d), (J $\approx$ 2 cps) (C - 2 and C - 4 aromatic): molecular ion, m/e = 369 with M-15 peak at 354.

Anal. Calcd. for $C_{25}H_{39}NO$: C, 81.24; H, 10.64; N, 3.79.

Found: C, 81.35; H, 10.45; N, 3,96.

Other compounds preparable by the above procedure include the following. Chemical and physical properties are also listed. $\Delta^{6a(10a)}$-1-amino-7,8,9,10-tetrahydro-3,6,6,9-tetramethyl-6H-dibenzo [b,d]pyran. nmr absorption (CDCl$_3$) at 0.95$\delta$ (d), C-9 methyl, 1.15$\delta$ (s), 1.35 (s), C-6 methyls, 2.10$\delta$ (s), C-3 methyl, 3.65$\delta$ (broad), amino, 5.95$\delta$ (d), 6.10 (d), (C-2 and C-4 aromatic); molecular ion, m/e=257 with M-15 peak at 242.

Anal. Calcd. for $C_{17}H_{23}NO$: C, 79.33; H, 9.01; N, 5.44.

Found: C, 79.09; H, 9.09; N, 5.16.

$\Delta^{6a(10a)}$-1-amino-3-(n-pentyl)-7,8,9,10-tetrahydro-6,6,9-trimethyl-6H-dibenzo[b,d]pyran, nmr absorption (CDCl$_3$) at 1.20$\delta$ (s), 1.40 (s), C-6 methyls, 3.75$\delta$ (broad singlet), amino,. 6.05$\delta$ (d), 6.15 (d), C-2 and C-4 aromatic; $\lambda_{max}^{MeOH}$ = 234 m$\mu$ (23,400), 278m$\mu$ (11,200); molecular ion, m/e = 313 with M-15 peak at 298.

Anal. Calcd. for $C_{21}H_{31}NO$: C, 80.46; H, 9.97; N, 4.47.

Found: C, 80.70; H, 9.97; N, 4.45. $\Delta^{6a(10a)}$-1-amino-3-(1',1'-dimethylheptyl)-7,8,9,10-tetrahydro6,6,9-trimethyl-6H-dibenzo[b,d]pyran. nmr absorption (CDCL$_3$) at 1.20$\delta$ (s), (C-1' and C-6 methyls), 3.75$\delta$ (broad) amino, 6.20$\delta$ (d), 6.30 (d), (C-2 and C-4 aromatic); molecular ion, m/e =369 with M-15 peak at 354.

Anal. Calcd. for $C_{25}H_{39}NO$: C, 81.24; H, 10.64; N, 3.79.

Found: C, 81.45; H, 10.45; N, 3.82.

$\Delta^{6a(10a)}$-amino-3-(2'-methylcyclohexyl)-7,8,9,10-tetrahydro6,6,9-trimethyl-6H-dibenzo[b,d]pyran, nmr absorption (CDCl$_3$) at 0.70$\delta$ (d), C-9 methyl, 1.00$\delta$ (d), (C-2' methyl), 1.20$\delta$ (s), 1.45$\delta$ (s) (C-6 methyls) 3.80$\delta$ (broad) amino, 6.10$\delta$ (d) 6.20 (d), (C-2 and C-4 aromatic); molecular ion, m/e = 339 with M-15 peak at 324.

Anal. Calcd. for $C_{23}H_{33}NO$: C, 81.37; H, 9.80; N, 4.13.

Found: C, 81.11; H, 9.61;N, 4.31.

Example 4

Synthesis of
$\Delta^{6a(10a)}$-1-Acetylamino-3-(1',2'-dimethylheptyl)-7,8,9,10-tetrahydro-6,6,9-trimethyl-6H-dibenzo[b,d]pyran About 738 mg. of $\Delta^{6a(10a)}$-1-amino-3-(1',2'-dimethyl(heptyl-7,8,9,10-tetrahydro-6,6,9-trimethyl-6H-dibenzo [b,d]pyran were dissolved in 10 ml. of tetrahydrofuran and the solution placed in a 50 ml. flask. 212 mg. of triethylamine were added and the resulting mixture cooled to about 0°C. 165 mg. of acetyl chloride dissolvled in 10 ml. of tetrahydrofuran were added over a ten minute period. Triethylamine hydrochloride precipitated immediately. The reaction mixture was allowed to stand overnight. Ten ml. of water were next added, and the organic solvent removed by evaporation in vacuo. The aqueous mixture was extracted with three 50-ml. portions of ether, and the ether extracts combined. The combined extracts were dried, and ether removed therefrom by evaporation in vacuo to yield a gummy substance comprising of $\Delta^{6a(10a)}$-1-acetylamino-3-(1',2'-dimethylheptyl)-7,8,9,10-tetrahydro-6,6,9-trimethyl-6H-dibenzo[b,d]pyran formed in the above reaction. The gum was dissolved in benzene and chromatographed over 50 g. of silica gel. The chromatogram was developed with 4 liters of benzene containing 2% ethyl acetate. The chromatography was followed by thin layer chromatography in a 10% ethyl acetate-benzene system. Fractions containing substances different from starting material were combined and yielded 610 mg. of a white foamy residue comprising of $\Delta^{6a(10a)}$-1-acetylamino-3-(1',2'-dimethylheptyl)-7,8,9,10-tetrahydro-6,6,9-trimethyl-6H-dibenzo[b,d]pyran. The compound had the following physical and chemical characteristics:

nmr absorption (CDCl$_3$) at 2.15δ (broad) (methylamino), 6.05 (d), 6.15 (d) (C-2 and C-4 aromatic); molecular ion, m/e = 411 with M-15 peak at m/e = 396. Anal. Calcd. for C$_{27}$H$_{41}$NO$_2$: C, 78.78; H, 10.04; N, 3.40.

Found: C, 79.17; H, 10.05; N, 3.40.

Other compounds preparable by the above procedure include:

Δ$^{6a(10a)}$-1-acetylamino-3-n-pentyl-7,8,9,10-tetrahydro-6,6,9-trimethyl-6H-dibenzo[b,d]pyran having the following physical and chemical characteristics: nmr absorption (CDCl$_3$) at 1.25δ (s), 1.45 (s), C-6 methyls, 2.15δ (broad singlet), acetyl methyl, 6.40-7.20δ (m), (C-2 and C-4 aromatic), 7.15δ (broad), NH;

Anal. Calcd. for C$_{23}$H$_{33}$NO$_2$: C, 77.70; H, 9.36; N, 3.94.

Found: C, 77.59; H, 9.26; N, 3.93.

m.p. = 175°-176°C. after recrystallization from a benzenepetroleum ether solvent mixture. Molecular ion, m/e = 355 with peak at M-15 = 340 and peak at M-43 = 312.

Other acyl derivatives of Δ$^{6a(10a)}$-1-amino-3-(1',2'-dimethylheptyl)-7,8,9,10-tetrahydro-6,6,9-trimethyl-6H-dibenzo[b,d]pyran can be prepared by substituting the appropriate acyl chloride acetyl chloride in the above example. Acetyl derivatives of the 1-amino compounds described in the previous example are readily prepared by the procedure of the above example.

EXAMPLE 5

Preparation of
Δ$^{6a(10a)}$-1-Methylamino-3-(1',2'-dimethylheptyl)-7,8,9,10-tetrahydro-6,6,9-trimethyl-6H-dibenzo[b,d]pyran.

A solution containing 738 mg. of Δ$^{6a(10a)}$-1-amino-3-(1',2'-dimethylheptyl)-7,8,9,10-tetrahydro-6,6,9-trimethyl-6H-dibenzo[b,d]pyran dissolved in 20 ml. of THF was placed in a 50 ml. flask. 300 mg. of formylimidazole were added and the resulting solution stirred at room temperature for about 24 hours. Another 150 mg. of formylimidazole were added and stirring at room temperature continued overnight. The solvents were removed by evaporation in vacuo to yield a gum comprising a 1-formylamino derivative. The gum was dissolved in benzene and chromatographed over 50 g. of silica gel. The chromatogram was developed with 4 liters of benzene containing 3–4% of ethyl acetate. Fractions indicated by thin layer chromatography over silica gel to contain material other than starting material were combined and the solvents evaporated therefrom in vacuo. About 210 mg. were obtained of a viscous oil comprising of Δ$^{6a(10a)}$-1-formylamino-3-(1',2'-dimethylheptyl)-7,8,9,10-tetrahydro-6,6,9-trimethyl-6-H-dibenzo[b,d]pyran having a molecular ion, m/e = 397 with an M-15 peak at m/e = 382.

The above viscous oil was dissolved in about 5 ml. of benzene and the solution placed in a 50 ml. flask. To this solution was added slowly 3 ml. of a 70% benzene solution containing sodium dimethoxyethoxyaluminum hydride in 5 ml. of benzene. The resulting mixture was stirred at room temperature for about 1 hour and was then cooled. The aluminum hydride reducing agent and the aluminum salts formed in the reaction were decomposed with 20 ml. of 10% aqueous hydrochloric acid. The organic layer was separated and the aqueous layer extracted with two 50 ml. portions of ether. The ether extracts were separated and combined with the original ether layer. The combined ether layers were washed with 20 ml. of 1N aqueous sodium hydroxide, and 20 ml. of water. The ether solution was then dried and, the ether removed therefrom by evaporation in vacuo. The resulting gum comprising of Δ$^{6a(10a)}$-1-methylamino-3-(1',2'-dimethylheptyl)-7,8,9,10-tetrahydro-6,6,9-trimethyl-6H-dibenzo[b,d]pyran with the following physical characteristics: nmr. absorption (CDCl$_3$) at 2.85δ (s) (methylamino), 6.05 (d), 6.15 (d) (aromatic); molecular ion, m/e = 383 with M-15 peak at m/e = 368.

Anal. Calcd. for C$_{26}$H$_{41}$NO: C, 81.41; H, 10.77; N, 3.65.

Found: C, 81.25; H, 10.84; N, 3.54.

Δ$^{6a(10a)}$-1-methylamino-3-n-pentyl-7,8,9,10-tetrahydro6,6,9-trimethyl-dibenzo[b,d]pyran was prepared by the above procedure and had the following characteristics. nmr absorption (CDCl$_3$) at 1.20δ (s), 1.40 (s), C-6 methyls, 2.80δ (s), methylamino, 6.05δ (d), 6.15 (d), (C-2 and C-4 aromatic). Other alkyl derivatives of Δ$^{6a(10a)}$-1-amino-3-(1',2'-dimethylheptyl)-7,8,9,10-tetrahydro-6,6,9-trimethyl-6H-dibenzo[b,d]-pyran can be prepared by substituting the appropriate substituted imidazole for formylimidazole in the above example. N-methyl derivatives of the 1-amino compounds of this invention preparable by the procedure of Example 3 can likewise be prepared by the procedure of the above example substituting the appropriate 1-amino-starting material for Δ$^{6a(10a)}$-1-amino3-(1',2'-dimethylheptyl)-7,8,9,10-tetrahydro-6,6,9-trimethyl6H-dibenzo[b,d]pyran.

EXAMPLE 6

Synthesis of
Δ$^{6a(10a)}$-1-Dimethylamino-3-(1',2'-dimethylheptyl)-7,8,9,10-tetrahydro-6,6,9-trimethyl-6H-dibenzo-[b,d]pyran.

A mixture containing 738 mg. of Δ$^{6a(10a)}$-1-amino3-(1',2'-dimethylheptyl)-7,8,9,10-tetrahydro-6,6,9-trimethyl-6H-dibenzo[b,d]pyran dissolved in 50ml. of anhydrous ethanol, 125 mg. of 10% palladium on carbon and 2 ml. of 37% aqueous formalin was hydrogenated in a low pressure hydrogenation apparatus at about 50 psi for a period of about 16 hours. The hydrogenation mixture was removed from the apparatus, and the catalyst separated by filtration. Evaporation of the filtrate to dryness yielded an oil comprising Δ$^{6a(10a)}$-1-dimethylamino-3-(1',2'-dimethylheptyl)-7,8,9,10-tetrahydro-6,6,9-trimethyl 6H-dibenzo[b,d]pyran. The residue was dissolved in benzene and chromatographed over 50 g. of silica gel. Elution with 500 ml. of benzene yielded 660 mg. of a viscous oil consisting of Δ$^{6a(10a)}$-1-dimethyl-amino-3-(1',2'-dimethylheptyl)-7,8,9,10-tetrahydro-6,6,9-trimethyl-6H-dibenzo[b,d,]pyran with the following physical characteristics: n.m.r. absorption (CDCl$_3$) at 2.6δ (s) (dimethylamino), 6.35δ (s) (aromatic); molecular ion, m/e = 397 with M-15 peak at 382.

Anal. Calcd. for C$_{27}$H$_{43}$NO: C, 81.55; H, 10.90; N, 3.52.

Found: C, 81.77; H, 10.75; N, 3.52.

Following the above procedure, Δ$^{6a(10a)}$-1-amino-3-n-pentyl-7,8,9,10-tetrahydro-6,6,9-trimethyl-6H-dibenzo[b,d] pyran was reductively alkylated with formalin to yield the corresponding N,N-dimethyl derivative having the following physical and chemical characteristics: n.m.r. absorption (CDCl$_3$) at 2.65δ (s), dimethylamino, 6.35δ (s), aromatic; molecular ion, m/e = 341 with M-15 peak at 326.

Anal. Calcd. for $C_{23}H_{35}NO$: C, 80.88; H, 10.33; N, 4.10.

Found: C, 81.03; H, 10.47; N, 4.06.

Other 1-amino compounds prepared by the procedure of Example 3 can be dimethylated by the procedure of the above example to yield the corresponding N,N-dimethyl derivative. The 1-amino-3-alkyl-6a,7,8,9,10,10a-hexahydro-6H-dibenzo[b,d] pyrans of this invention (Formula Ia above) can also be prepared by the catalytic hydrogenation of the corresponding $\Delta^{6a(10a)}$ derivative furnished by the procedures of Examples 1-6. Suitable catalysts and solvents include platinum oxide in acetic acid or palladium-on-charcoal in ethanol.

The compounds of this invention have demonstrated activity in one or more of the following standard laboratory pharmacological tests--muricidal rat, septal-lesioned rat, and inhibition of mouse writhin. writhing. in the muricidal rat test indicates potential utility as an antidepressant and appetite suppressant, activity in the septal-lesioned rat test indicates potential utility as an anti-anxiety drug or tranquilizer, and inhibition of mouse writhing indicates potential utility as an analgesic.

For example, $\Delta^{6a(10a)}$-1-amino-3-(1',2'-dimethylheptyl) 7,8,9,10-tetrahydro-6,6,9-trimethyl-6H-dibenzo[b,d]pyran inhibits mouse writhing when administered by either the subcutaneous, intravenous or oral routes. The corresponding 3-n-pentyl derivative with an acetamido group at 1 also shows analgesic activity. $\Delta^{6a(10a)}$-1-amino-3-(1',2'-dimethylheptyl)-7,8,9,10-tetrahydro-6,6,9-trimethyl-6H-dibenzo[b,d]pyran is also active in both the muricidal rat test (at a 10 mg/kg of rat weight oral dose) and in the septal-lesioned rat test. The same compound shows activity as an appetite depressant with a minimal effective dose of 5 mg/kg of rat weight. The 1-methylamino analogue shows analgesic activity at 20 mg/kg dosage and $\Delta^{6a(10a)}$-1-amino-3-(2'-methylcyclohexyl)-7,8,9,10-tetrahydro-6,6,9-trimethyl-6H-dibenzo[b,d]pyran has analgesic activity when administered by the oral route. $\Delta^{6a(10a)}$-1-amino-3-(1',1'-dimethylheptyl)-7,8,9,10-tetrahydro-6,6,9-trimethyl-6H-ibenzo[b,d]pyran also shows activity in the muricidal rat assay.

The compounds of this invention may be administered by the oral or intravenous route. For oral administration, they can be formulated in tablets or telescoping gelatin capulses or in a solution or suspension in aqueous media. A suitable quantity of the drug is mixed with starch or other excipient, and the mixture placed in telescoping gelatin capsules. Similarly, the drug can be mixed with starch, a binder and a lubricant, and the mixture compressed into tablets containing an effective dose of the drug. The tablets may be scored if lower or divided dosages are to be used. Another suitable oral dosage form comprises an aqueous suspension of the drug in the presence of about 1 percent of a suitable surfactant such as Tween 80. Subcutaneous administration is suitably carried out with an acetone-dispersed suspension of the drug in water containing a surfactant in low (1 percent) concentration.

Other suitable pharmaceutical forms for oral or parenteral administration will be apparent to those skilled in the art.

It will be apparent to those skilled in the art that the processes of this invention can be applied to 1-hydroxy-3-alkyl-tetrahydrodibenzo[b,d]pyrans other than the $\Delta^{6a(10a)}$ compounds described above. For example, $\Delta^{8}$-1-hydroxy-3-alkyl-6,6,9-trimethyl-6a,7,10,10a-tetrahydro-6H-dibenzo[b,d]-pyrans and $\Delta^{9}$-1-hydroxy-3-alkyl-6,6,9-trimethyl-6a,7,8,9,10a-tetrahydro-6H-dibenzo[b,d]pyrans are readily available from the literature and can be transformed by the processes described herein to the corresponding 1-amino-1-alkylamino and 1-dialkylamino, as well as the 1-acyl amino, derivatives, all of which will have similar pharmacological utility to that of the $\Delta^{6a(10a)}$ compounds of this invention.

We claim:

1. A compound of the formula of the group consisting of

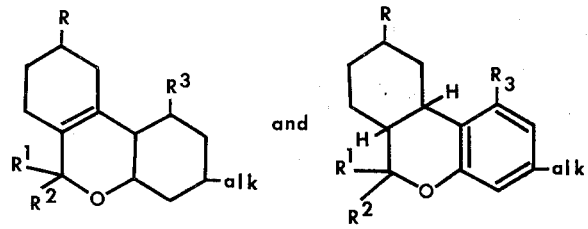

wherein R, $R^1$ and $R^2$ are individually hydrogen or methyl, alk is a $C_1-C_{10}$ alkyl group or a $C_3-C_8$ cycloalkyl group and $R^3$ is amino, lower alkyl amino, di-lower alkylamino, or lower alkanoyl amino.

2. A compound according to claim 1, said compound being $\Delta^{6a(10a)}$-1-amino-3-(1',2'-dimethylheptyl)-7,8,9,10-tetrahydro-6,6,9-trimethyl-6H-dibenzo[b,d]pyran.

3. A compound according to claim 1, said compound being $\Delta^{6a(10a)}$-1-methylamino-3-(1',2'-dimethylheptyl)-7,8,9,10-tetrahydro-6,6,9-trimethyl-6H-dibenzo[b,d]pyran.

4. A compound according to claim 1, said compound being $\Delta^{6a(10a)}$-1-amino-3-(1',1'-dimethylheptyl)-7,8,9,10-tetrahydro-6,6,9-trimethyl-6H-dibenzo[b,d]pyran.

5. A compound according to claim 1, said compound being $\Delta^{6a(10a)}$-1-amino-3-n-pentyl-7,8,9,10-tetrahydro-6,6,9-trimethyl-6H-dibenzo[b,d]pyran.

6. A compound according to claim 1, said compound being $\Delta^{6a(10a)}$-1-acetylamino-3-(1',1'-dimethylheptyl)-7,8,9,10-tetrahydro-6,6,9-trimethyl-6H-dibenzo[b,d]pyran.

7. A compound according to claim 1, said compound being $\Delta^{6a(10a)}$-1-amino-3-(2'methylcyclohexyl)-7,8,9,10-tetrahydro-6,6,9-trimethyl-6H-dibenzo[b,d]pyran.

* * * * *

UNITED STATES PATENT AND TRADEMARK OFFICE
CERTIFICATE OF CORRECTION

PATENT NO. : 3,886,184
DATED : May 27, 1975
INVENTOR(S) : Ken Matsumoto, Robert A. Archer It is certified that error appears in the above-identified patent and that said Letters Patent are hereby corrected as shown below:

Column 1, line 66, "1419" should be --1416--.
Column 3, lines 38-39 "9,1-0," should read --9,10,--
Column 5, lines 60-61, "center-s" should read --centers--.
Column 6, line 34, "usisng" should be --using--.
Column 6, line 43, delete "ethylamino".
Column 7, line 56, "N,6.13. N, 6.18" should read --N,6.77. N,6.13--
Column 8, line 9, delete "10".
Column 9, line 34, should read ---1-(2'-phenyl-4'-oxo-3'-quinazolinyl)-3-(1',2'--.

Signed and Sealed this

Fourteenth Day of September 1976

[SEAL]

Attest:

RUTH C. MASON
Attesting Officer

C. MARSHALL DANN
Commissioner of Patents and Trademarks